(12) United States Patent
Itagaki et al.

(10) Patent No.: US 6,239,845 B1
(45) Date of Patent: May 29, 2001

(54) TELEVISION RECEIVER AND RECEIVING METHOD THEREOF

(75) Inventors: Tsuguo Itagaki, Yokohama; Chihiro Ikeda; Akira Kitazume, both of Fujisawa, all of (JP)

(73) Assignees: Hitachi, Ltd., Tokyo; Hitachi Video and Information System, Incorporated, Yokohama, both of (JP)

( * ) Notice: Subject to any disclaimer, the term of this patent is extended or adjusted under 35 U.S.C. 154(b) by 0 days.

(21) Appl. No.: 08/914,148

(22) Filed: Aug. 19, 1997

(30) Foreign Application Priority Data

Aug. 22, 1996 (JP) ................................... 8-221000

(51) Int. Cl.⁷ .............................. H04N 7/00; H04N 11/00
(52) U.S. Cl. ........................ 348/552; 348/563; 348/734
(58) Field of Search .................... 348/552, 553, 348/565, 571, 718, 719, 725, 836, 843, 705, 706, 563, 564, 730, 734; H04N 5/44, 7/00, 11/00

(56) References Cited

U.S. PATENT DOCUMENTS

| | | | |
|---|---|---|---|
| 5,621,482 | * | 4/1997 | Gardner et al. ....................... 348/552 |
| 5,661,517 | * | 8/1997 | Budow et al. ......................... 348/13 |
| 5,787,259 | * | 7/1998 | Haroun et al. ........................ 348/552 |
| 5,790,201 | * | 8/1998 | Antos .................................... 348/552 |
| 5,850,340 | * | 12/1998 | York ..................................... 348/552 |
| 5,876,286 | * | 3/1999 | Lee ....................................... 348/565 |
| 6,040,872 | * | 3/2000 | Kim ..................................... 348/553 |

FOREIGN PATENT DOCUMENTS

| | | |
|---|---|---|
| 61-177088 | 8/1986 | (JP) . |
| 4-252680 | 9/1992 | (JP) . |
| 7-131768 | 5/1995 | (JP) . |

\* cited by examiner

Primary Examiner—Michael H. Lee
(74) Attorney, Agent, or Firm—Antonelli, Terry, Stout & Kraus, LLP (57) ABSTRACT

A television receiver and a signal receiving method thereof includes a terminal for connecting the television receiver to a personal computer for inputting information from the personal computer to the television receiver, a display for displaying a television signal, an input operation means, such as a remote controller, for generating a command signal, and a controller supplied with the command signal for controlling the personal computer and for inputting the information from the personal computer through the terminal to the television receiver for converting the television receiver from a television mode to a personal computer mode for displaying the information on a screen of said display. Advantageously, the personal computer and the television receiver are controlled by a command signal from the input operation means. The receiver and receiving method further includes a screen display processor for displaying a software keyboard on the screen of the display, which allows for selection of a character by using said input operation means. The screen display processor is further provided with a drag mode display menu means for displaying a drag mode on the display when a drag mode signal is generated from the input operation means.

21 Claims, 6 Drawing Sheets

TELEVISION RECEIVER AND RECEIVING METHOD THEREOF

BACKGROUND OF THE INVENTION

The invention relates to a television receiver having a terminal to which a personal computer may be connected for displaying information received from the personal computer.

A television receiver that is able to receive not only television broadcasting directly and via an AV device (an audio-video device), such as a VCR, but also can be connected to a personal computer for displaying information received from the internet or a CD-ROM on a large screen is well known. An example of this type of television receiver with the aforementioned functions is disclosed in an issue of NIKKEI personal computer (Jan. 1, 1995). The television receiver disclosed in the aforementioned publication can receive or display information from television broadcasting, such as NTSC (horizontal frequency: 15.75 kHz), extended definition television broadcasting (one of Japanese broadcasting standard with horizontal frequency 31.5 kHz)and high definition television broadcasting (one of Japanese broadcasting standard with horizontal frequency: 33.75 kHz), AV type media, such as a package media, and media that is used for a personal computer or a multimedia device, such as a VGA mode (horizontal frequency: 31.5 kHz) output of a personal computer compatible with IBM PC/AT or a color mode (horizontal frequency: 35 kHz) output of the Apple computer Macintosh 13.

As to the above disclosed television receiver, which may be connected with a personal computer, a mouse or a keyboard of the personal computer is used for operating the personal computer and for displaying information from the computer on the television screen, and the remote controller of the television receiver is used only to operate the television receiver. However, it is not so easy to handle such a combination of equipment in a television receiver with a personal computer. Further, it is inconvenient to input a character or a symbol by using the keyboard of the personal computer.

SUMMARY OF THE INVENTION

It is an object of the present invention to provide a television receiver with an interface which makes it possible to operate a personal computer connected thereto by using the remote controller of the television receiver.

It is another object of the present invention to provide a television receiver of the type described in which a character or a symbol is displayed on the television screen and is selected by using the remote controller for the television receiver.

According to the present invention, an interface for controlling a personal computer is provided in a television receiver, and the personal computer is controlled and operated by using the remote controller for the television receiver.

According to another feature of the present invention, it is possible to display a character or a symbol on the television display screen, the character or the symbol being selected by using input operation means, such as a remote controller for the television receiver.

BRIEF DESCRIPTION OF THE DRAWINGS

FIG. 3($a$) is a signal diagram which illustrates signals used for the communication between a television receiver and a personal computer.

FIG. 3($b$) is a signal diagram which illustrates signals used for the communication between a control processing means and a PC interface control circuit.

FIG. 4($a$) is a plan view illustrating a control panel of a remote controller for a television receiver.

FIG. 4($b$) is a diagram which illustrates a menu relating to a personal computer on a television display screen.

FIG. 6($a$) is a diagram of one example of an input screen for the application software of FIG. 5 on a television display screen.

FIG. 6($b$) is a diagram of one example of a screen for a software keyboard on a television display screen.

DESCRIPTION OF THE PREFERRED EMBODIMENTS

Figure 1:
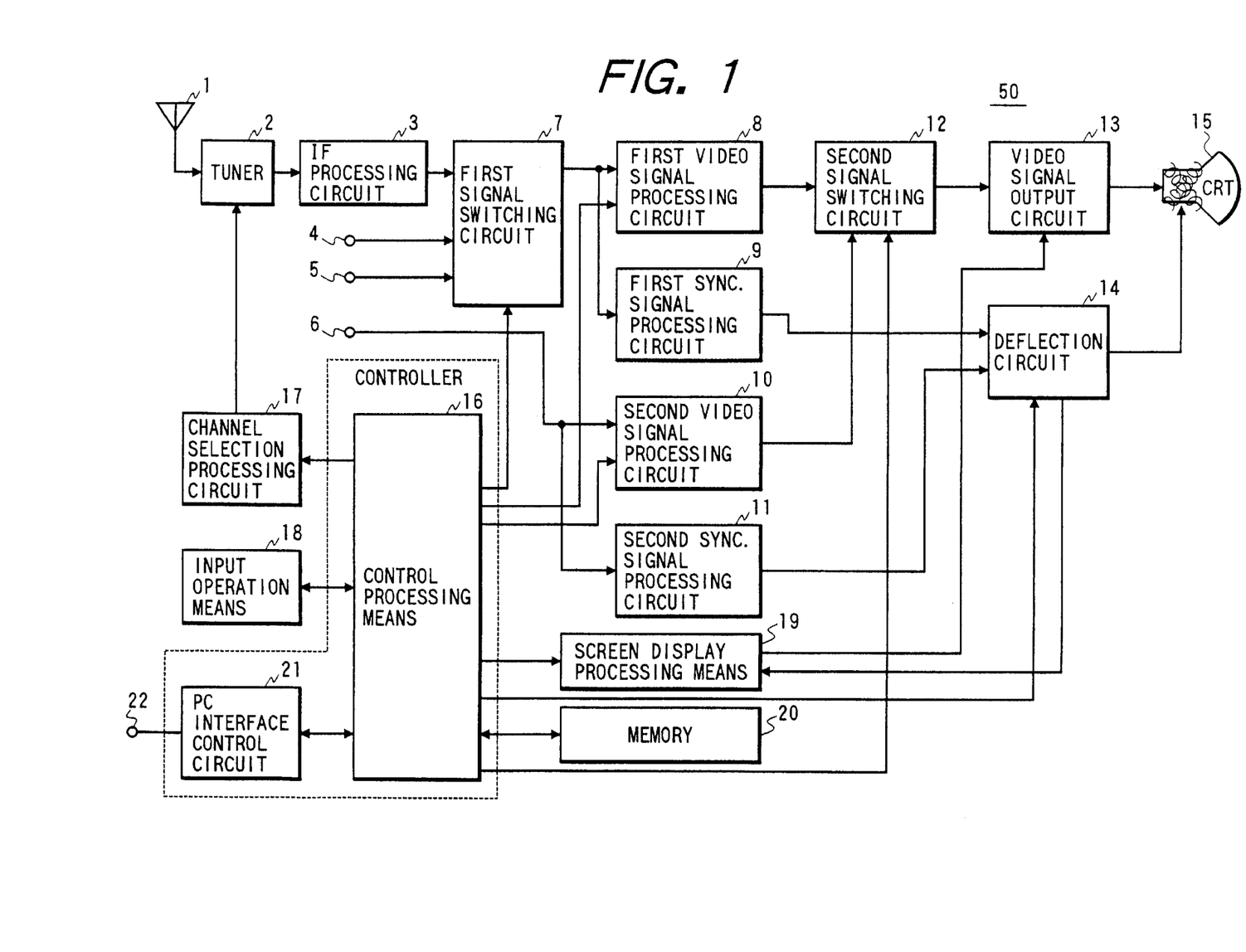
FIG. 1 is a block diagram illustrating a television receiver having an interface function for interfacing with a personal computer.

Referring now to the drawings, wherein like reference numerals are utilized to designate like parts throughout the several views, FIG. 1 is a block diagram illustrating a television receiver having an interface function used for communication with a personal computer. Referring to FIG. 1, reference numeral 50 generally denotes a television receiver. The television receiver 50 includes an antenna 1, a tuner 2, an IF (intermediate frequency) processing circuit 3, external input terminals 4 and 5 for inputting a signal from a VCR or a video disk, a PC (personal computer) input terminal 6 for inputting information from a personal computer, a first signal switching circuit 7, a first video signal processing circuit 8 for processing a NTSC signal, a first synchronizing signal processing circuit 9 for processing a NTSC signal, a second video signal processing circuit 10 for processing information from the personal computer, a second synchronizing signal processing circuit 11 for processing information from the personal computer, a second signal switching circuit 12, a video signal output circuit 13, a deflection circuit 14, a CRT (cathode ray tube) 15, a control processing means 16, a channel selection processing circuit 17, an input operation means 18, a screen display processing circuit 19, a memory 20, a PC interface control circuit 21 and a PC control terminal 22. A controller for controlling the television receiver and the personal computer is formed by the control processing means 16 and the PC interface control circuit 21.

Control information required for an adjustment of the television receiver, such as a channel preset adjustment, an image adjustment including brightness and contrast settings, an audio adjustment including balance, bass and treble settings, a raster adjustment including a horizontal position adjustment, a horizontal size adjustment, a vertical position adjustment and a vertical size adjustment, a user setting including on or off control of a parameter and an adjustment set in the factory, is stored in the memory 20. The control processing means 16 controls each part of the television receiver by using control information stored in the memory 20, which is accessed in response to a command signal (indication information) received from input operation means 18, which is typically a remote controller.

A received signal from the antenna 1 is supplied to the tuner 2. The channel selection processing circuit 17 is controlled by a tuner control signal outputted from the control processing means 16 when a channel is selected by the input operation means 18. The television signal corresponding to the channel selection signal supplied from the channel selection processing circuit 17 is selected in the tuner 2. The selected signal is subjected to a processing, such as signal amplification and detection, in the IF processing circuit 3 and is supplied to the first signal switching circuit 7. Also, a video signal from external equipment, such as a VCR or a video disk, supplied through the external input terminals 4, 5, is supplied to the first signal switching circuit 7. The first signal switching circuit 7 is controlled by a switch control signal received from the control processing means 16 and outputs either the video signal received from the IF processing circuit 3 or a video signal received from the external input terminals 4 and 5.

After processing has been performed in the first video signal processing circuit 8, the video signal that is outputted from the first signal switching circuit 7 passes though the second signal switching circuit 12, is amplified in the video signal output circuit 13 and is supplied to the CRT 15. Further, the video signal outputted from the first signal switching circuit 7 is supplied to the first synchronizing signal processing circuit 9, in which the horizontal synchronizing signal and the vertical synchronizing signal are separated. These synchronizing signals are supplied to the deflection circuit 14 and the deflection of the electron beam in CRT 15 is thereby controlled in the well-known manner. In case a plasma display panel or a liquid crystal display device is used instead of CRT 15, a pixel conversion circuit, a horizontal driver circuit and a vertical driver circuit are used instead of the deflection circuit 14.

After processing has been performed in the second video signal processing circuit 10, a PC signal (a signal from a personal computer) of the VGA mode (horizontal frequency: 31.5 kHz) inputted to the PC input terminal 6 is supplied to the second signal switching circuit 12. The PC signal is also supplied to the second synchronizing signal processing circuit 11 in which the presence or the absence of a horizontal synchronizing signal and a vertical synchronizing signal is detected, the polarities of these synchronizing signals are distinguished, and the horizontal and the vertical synchronizing signals are supplied to the deflection circuit 14. In case a conversion means for converting the PC signal into a NTSC signal is provided in the personal computer, the personal computer is connected to the external input terminal 4, 5, although an example of using a PC signal of the VGA mode is used in the description of the embodiment of the present invention.

The second signal switching circuit 12 outputs either an output from the first video signal processing circuit 8 or an output from the second video signal processing circuit 10 in accordance with another switch control signal received from the control processing means 16. The screen display processing means 19 generates characters, symbols, a graphic display output or a software keyboard output in synchronization with a horizontal pulse and a vertical pulse outputted from the deflection circuit 14. A channel number or a menu, etc., is displayed on the screen of the CRT 15 in response to a command signal received from the input operation means 18, such as the operation panel of the TV or a remote controller.

Figure 2:
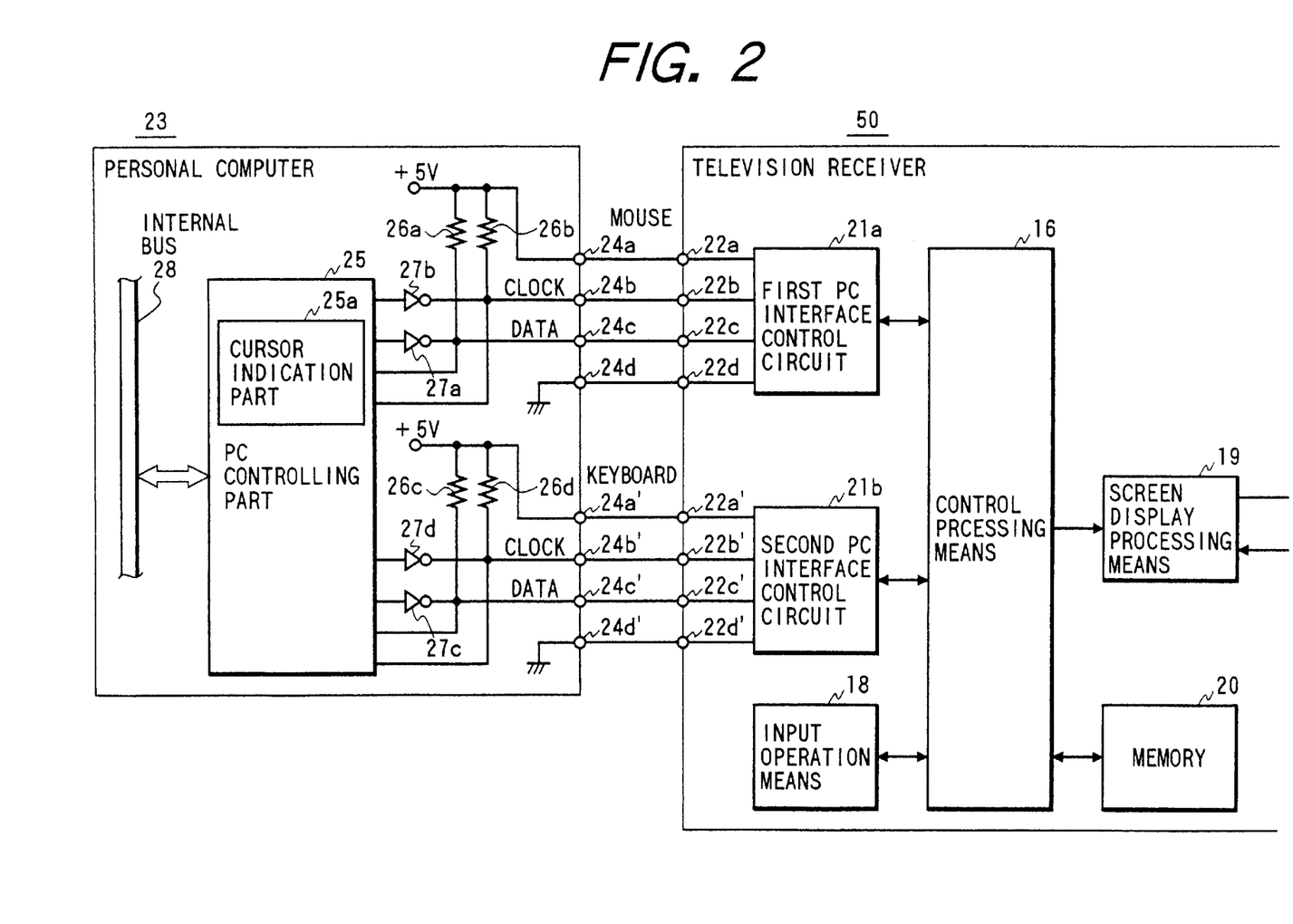
FIG. 2 is a block diagram illustrating an interface used for the communication between a television receiver and a personal computer.

The PC interface control circuit 21 is provided for communication with the personal computer through the PC control terminal 22. FIG. 2 is a block diagram illustrating an example of an interface of the type used for communication between a television receiver and a personal computer which is compatible with IBM PC/AT. The PC interface control circuit 21 is divided into a first PC interface control circuit 21a and a second PC interface control circuit 21b. The first PC interface control circuit 21a operates as an output means for mouse information, and is used for emulating the operation of a mouse. The second PC interface control circuit 21b operates as an output means for keyboard information and is used to emulate the operation of a keyboard. Reference numerals 22a–22d denote PS/2 AUX output terminals (hereinafter referred to as mouse output terminals). Reference numeral 23 denotes a personal computer (hereinafter referred to as a PC) and reference numerals 24a–24d denote PS/2 AUX input terminals. Reference numerals 22a'–22d' denote keyboard output terminals, and reference numerals 24a'–24d' denote keyboard input terminals. Reference numeral 25 denotes a PC controlling part to which a clock signal and a data signal are supplied from the first and the second PC interface control circuits 21a and 21b, and the output of the PC controlling part 25 is supplied to an internal bus 28 of a main microprocessor of the personal computer 23. A cursor indication part 25a is included in the PC controlling part 25. Reference numerals 26a–26d denote pull-up resistors, and reference numerals 27a–27d denote inverters for an output buffer. While the mouse output terminals 22a–22d are used for controlling the mouse in the embodiment, a serial mouse, that is a mouse which is controlled by a serial signal, can be used for communication via a serial port (an input and an output terminal for serial communication).

Referring to FIG. 2, when a command signal from the input operation means 18 is sent to the control processing means 16, serial data communication is performed between the control processing means 16 and the first and the second PC interface control circuits 21a and 21b. The terminals 22a–22d of the first PC, interface control circuit 21a are connected to the respective mouse input terminals 24a–24d for emulating the mouse. The terminals 22a'–22d' of the second PC interface control circuit 21b are connected to the respective keyboard input terminals 24a'–24d' for emulating the keyboard. A power source of 5V in the PC 23 is connected to the terminals 22a and 22a' through the terminals 24a and 24a', respectively. The power source is used as a power source of the first and the second PC interface control circuits 21a and 21b and is used for detecting the voltage of the PC 23. In the embodiment of the invention, the rising part of the 5V voltage in the PC 23 is detected in the first and the second PC interface control circuits 21a and 21b, and the detected signal is supplied to the control processing means 16 for setting the control processing means 16 to the PC mode automatically. A clock signal is communicated between the terminal 22b' and the terminal 24b and between the terminal 22b' and the terminal 24b', respectively. A data signal is communicated between the terminal 22c and the terminal 24c and between the terminal 22c' and the terminal 24c'.

Figure 3A:
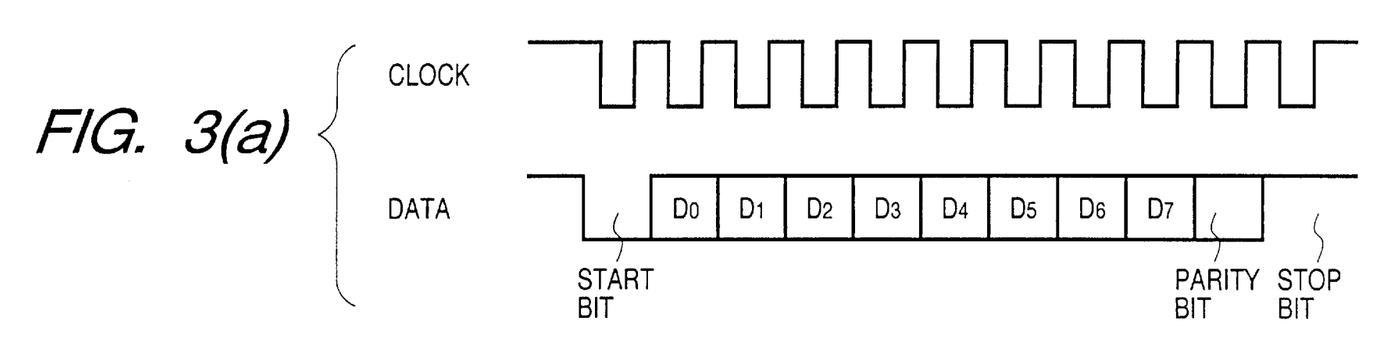

FIG. 3(a) illustrates clock signals and data signals used for the communication between the first and the second PC interface control circuits 21a and 21b and the PC controlling part 25. The data signal comprises a start bit, eight-bit data, a parity bit and a stop bit. A key code (scan code), which is information corresponding to the keyboard, is outputted from the second PC interface control circuit 21b to the PC controlling part 25. A command, such as an ACK (acknowledgment response), is outputted from the first and the second PC interface control circuits 21a and 21b to the PC controlling part 25, and another command for an ID (identification) read, or a change in setting, etc., is outputted from the PC controlling part 25 to the first and the second PC interface control circuits 21a and 21b.

When communication is started, the first and the second PC interface control circuits 21a and 21b check the clock lines (a line comprising the terminal 22b and the terminal 24b, and a line comprising the terminal 22b' and the terminal 24b') and the data lines (a line comprising the terminal 22c and 24c, and a line comprising the terminal 22c' and the terminal 24c'). When the clock lines are in the low state (hereinafter referred to as "L"), the first and the second PC interface control circuits 21a and 21b are prohibited from communicating with the PC controlling part 25. When the clock lines are in the high state (hereinafter referred to as "H") and the data lines are "L", the first and the second PC interface control circuits 21a and 21b are set to receive data from the PC controlling part 25. When the clock lines and the data lines are "H", the first and the second PC interface control circuits 21a and 21b are set to transmit data to the PC controlling part 25. The clock signals are supplied to the PC controlling part 25 from the first and the second PC interface control circuits 21a and 21b, and the data is transmitted in synchronism with the clock signals between the first and the second PC interface control circuits 21a and 21b and the PC controlling part 25.

In this way, two-way communications between the first and the second PC interface control circuits 21a and 21b and the PC controlling part 25 can be performed. By supplying a command, which is transmitted from the data lines of the PC 23, to the control processing means 16 through the first and the second PC interface control circuits 21a and 21b, the control processing circuit 16 is able to detect the connection with the PC 23. Therefore, the control processing means 16 is placed in the PC input mode automatically when the PC 23 is started. When the control processing means 16 is placed in the PC input mode automatically, the second signal switching circuit 12 is switched so as to be able to pass the signal from the PC 23, the deflection circuit 14 is controlled in a manner suitable for the PC input mode, and the output from the input operation means 18 is supplied to the PC 23 through the control processing means 16 and the PC interface control circuit 21. In FIG. 2, the terminal 22d, the terminal 24d, the terminal 22d' and the terminal 24d' are grounded terminals.

Figure 3B:
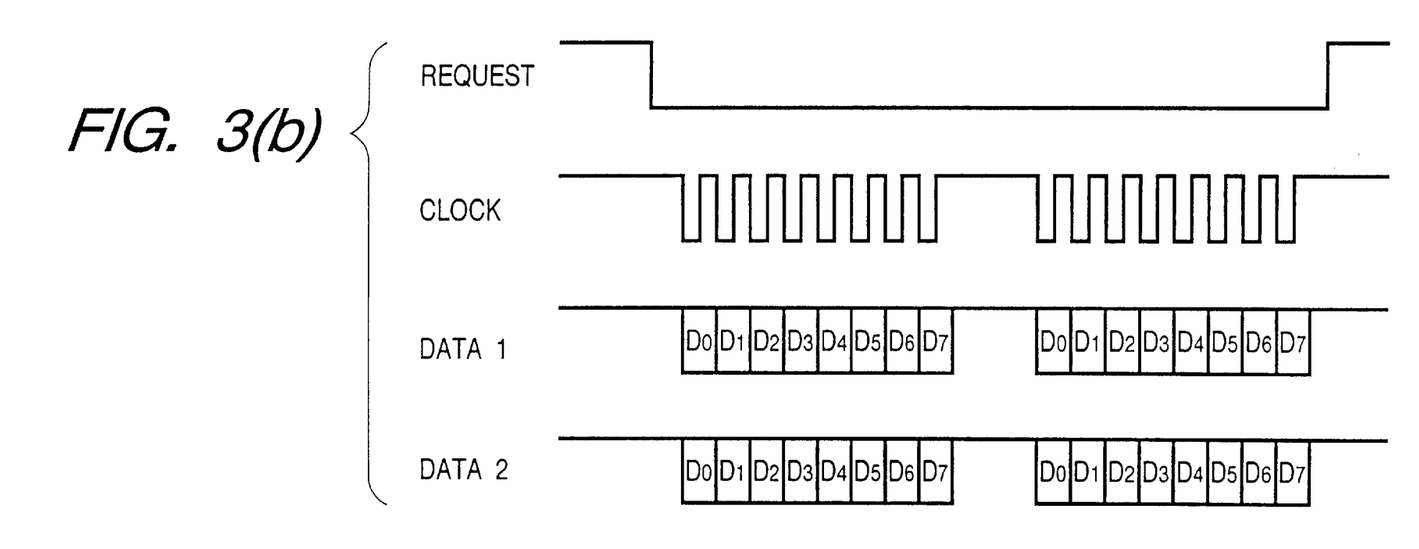

FIG. 3(b) illustrates a request signal, a clock signal and data 1 and data 2 used for the communication between the first and the second PC interface control circuits 21a and 21b and the control processing means 16. The request signal transmitted from the first and the second PC interface control circuits 21a and 21b to the control processing means 16 indicates the start of communication and generates a request for transmission when the signal changes to the "L" level from the "H" level. The control processing means 16 generates a clock signal and supplies it to the first and the second PC interface control circuits 21a and 21b when the control processing means 16 detects the request for transmission, and data is transmitted in synchronism with the clock signal between the first and the second PC interface control circuits 21a and 21b and the control processing means 16. The data signal 1, which comprises control information, such as a key code, data for setting a mouse movement speed and a signal relating to a dragging mode, is outputted to the first or the second PC interface control circuit 21a or 21b from the control processing means 16. The data 2, which comprises status information, such as a power on or off state, at the mouse input terminal 24a and at the keyboard input terminal 24a' of the PC 23, are outputted to the control processing means 16 from the first or the second PC interface control circuit 21a or 21b.

Figure 4A:
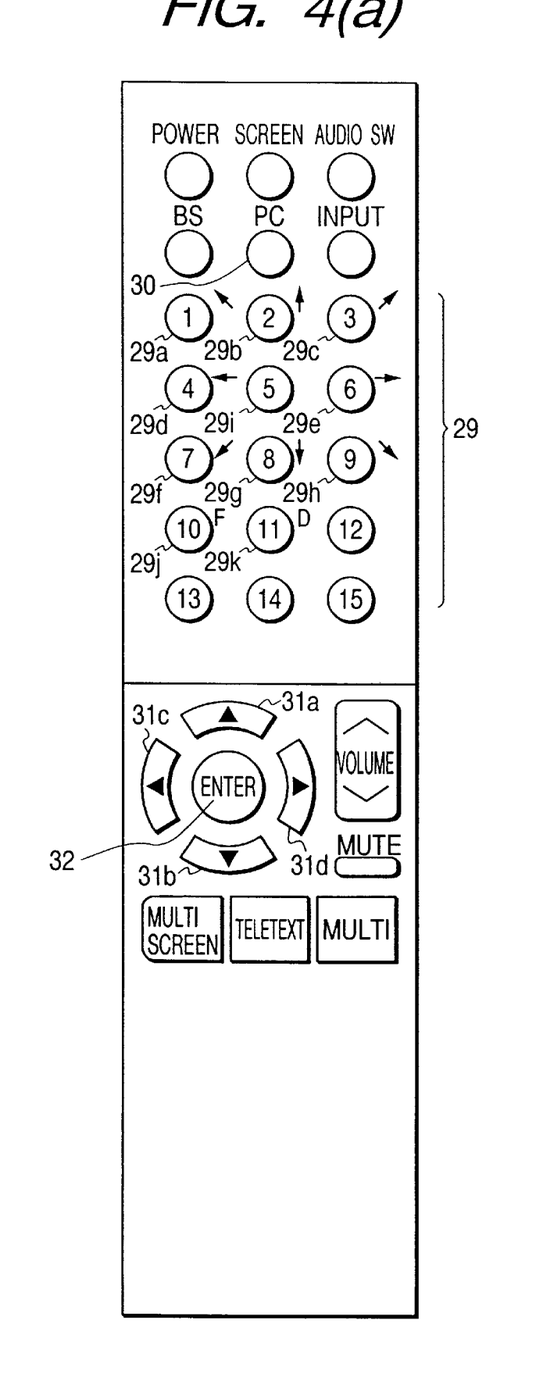

FIG. 4(a) is a plan view illustrating a control panel of a remote controller representing one embodiment of the input operation means 18. Reference numerals 29a–29k denote CH buttons (channel buttons), reference numeral 30 denotes a PC mode selection button, numerals 31a–31d denote direction indication buttons, and numeral 32 denotes an enter button. The buttons 29a–29k also operate as function selection buttons, in addition to channel buttons. The buttons 29a–29k have the functions, such as a mouse operation button, a left drag button of the mouse or a right drag button of the mouse, when they are used during the PC mode. The buttons 29a–29h also function as direction indication buttons when the remote controller operates in the PC input mode, and the early transmission function can give them the ability to move quickly to a goal. The mouse is moved in an oblique direction by using the buttons 29a, 29c, 29f and 29h. The button 29i has a function similar to the enter button 32 and corresponds to the left button of a PC mouse. The F button 29j is used to start the software keyboard function, whereby the software stored in the screen display processing means 19 is used to display a software keyboard on the screen of the CRT 15 in response to a control signal from the control processing means 16.

Figure 5:
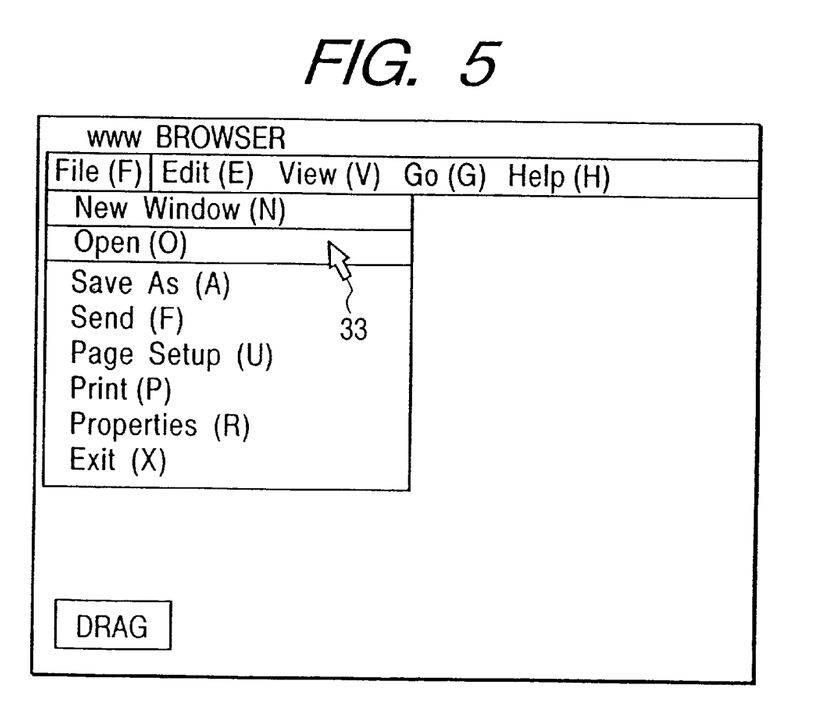
FIG. 5 is a diagram which illustrates a picture of an application software menu on a television display screen.

The D button 29k emulates the dragging of the left button or the right button of the mouse. When the button 29k is pressed, the indicator "DRAG" is displayed on the screen of the CRT 15, as shown in FIG. 5, and the dragging of the mouse can be performed by operating the direction indication buttons 29a–29d, 29e–29h, the drag mode being released when the button 29k is pressed again. When the D button 29k is pressed, the control processing means 16 generates a control signal corresponding to a command from the input operation means 18, and a signal for the indicator "DRAG" stored in the screen display processing means 19 is supplied to the CRT 15 through the video signal output circuit 13 for displaying "DRAG" on the screen thereof. Further, the control signal from the control processing means 16 is supplied to the cursor indication part 25a of the PC controlling part 25 through the first PC interface control circuit 21a so as to change the cursor indication part 25a to the drag mode, and also the command from cursor indication part 25a is supplied to the control processing means 16 for carrying out the drag mode.

The direction indication buttons 31a–31d are used for selection in a menu displayed on the screen of the CRT 15, and the enter button 32 is used for the determination of the menu in the TV mode. These buttons 31a–31d and 32 are used for both the TV mode and the PC input mode. When the PC 23 is not connected to the TV 50, the function of the direction indication buttons 31a–31d and the CH button 29a–29k is invalidated even if it is in the PC input mode. That is, in such a case, the command signal from the input operation means 16 (the output from the direction indication buttons 31a–31d and the CH button 29a–29k) is not received by the control processing means 16 and functions as operation information for the TV. When the PC 23 is not connected with the TV 50, the control processing means 16 is placed in the television mode so as to make it possible to receive and display a television signal by controlling the second signal switching circuit 12 and the deflection circuit 14 with a control signal from the control processing means 16.

In case of changing the brightness and the contrast of the television receiver and displaying these parameters on the screen, the control processing means 16 is controlled according to a command signal from the input operation means 18 and the screen display processing means 19 is also controlled by the control signal from the control processing means 16. Therefore, the information outputted from the screen display processing means 19 for display is supplied to the CRT 15 through the video signal output circuit 13. The control signal from the control processing means 16 is supplied to the first video signal processing circuit 8 to change the brightness or the contrast. In case of displaying the video information, the second video signal processing circuit 10 is controlled by the control signal from the control processing means 16 for controlling the brightness or the contrast. This control state is displayed on CRT 15 based on the information from the screen display processing means 19.

Figure 4B:
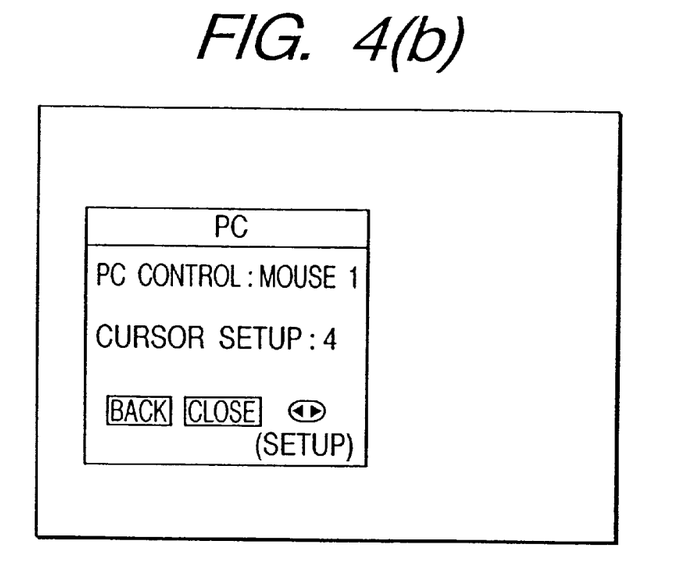

In the PC mode, by displaying information for an adjustment on the screen of the CRT 15, as shown in FIG. 4(b), the condition for operation of the mouse is changed.

While the cursor speed is four, in this example, the unit movement speed of the cursor is made faster by pressing the button 31d of the input operation means 18 (or the remote controller) and the speed value shown in FIG. 4(b) will be increased. The unit movement speed of the cursor is made slower by pressing the button 31c and the displayed speed value is thereby decreased. As a result, it is possible to adjust cursor speed separately from or independently of the setting in the PC unit. When the button 31c or the button 31d is pressed, the control signal from the control processing means 16 is supplied to the cursor indication part 25a through the first PC interface control circuit 21a, and the speed of the cursor is changed.

An example of the operation for an internet WWW browser application using with the PC 23 will be explained. When the power source of the PC 23 is turned on, 5V is supplied to the first or the second PC interface control circuit 21a or 21b from the mouse input terminal 24a or keyboard input terminal 24a', and the voltage of the input terminal of the circuit 21a or 21b is changed to the "H" level from the "L" level. When the circuit 21a or 21b detects the change, this change to the 5V power state is indicated to the control processing means 16 from the first or the second PC interface control circuit 21a or 21b. As a result, the control processing means 16 will recognize that the PC 23 is connected and will be placed in the PC input mode automatically. When the operation of the PC 23 is finished and the power of the PC 23 is turned off, the voltage of the input terminal of the first or the second PC interface control circuit 21a or 21b becomes zero, and the level of the input terminal thereof is changed to the "L" level from the "H" level. By detecting this change in the state of the circuit 21a or 21b and by supplying a signal indicating the change to the control processing means 16, the control processing means 16 turns to the ordinary television mode. The PC input mode or the ordinary television mode is selected by pressing the PC selection button 30.

Figure 6A:
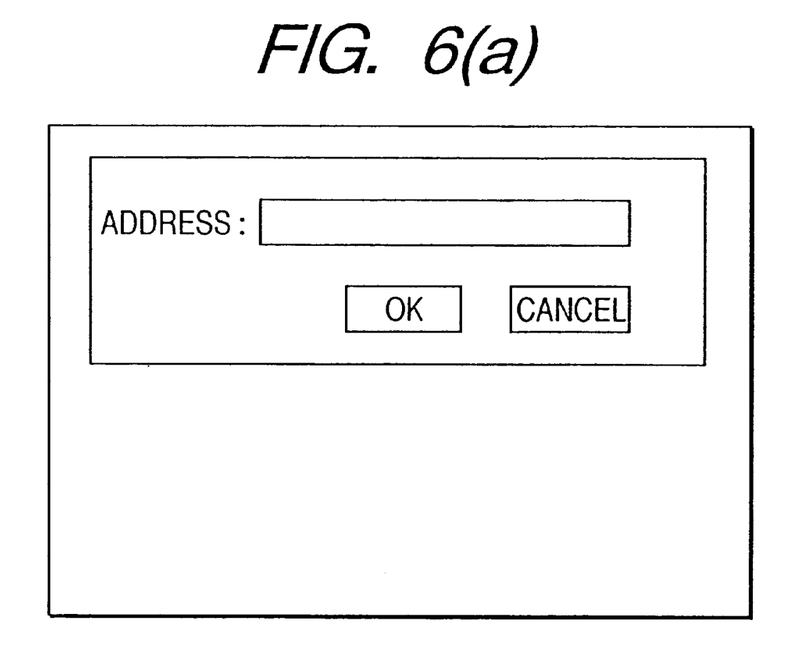

The menu of the internet WWW browser application is displayed on the screen of the CRT 15, as shown in FIG. 5, at a start of operation of the PC 23. The direction indication buttons 31a–31d operate the mouse in the PC input mode. By operating the direction indication buttons 31a–31d to move the cursor 33 to "open" in the menu and pressing the enter button 32, the screen for inputting an address that is a URL (uniform resource locator) of the WWW internet is displayed, as shown in FIG. 6(a). Next, the F button 29j of FIG. 4(a) is pressed and the control processing means 16 controls the screen display processing means 19 so as to display the software keyboard screen shown in FIG. 6(b). The letter "a" is initially selected as a default. Then, the alphanumeric character or the symbol to be inputted is selected from the screen by the direction indication buttons 31a–31d, and one of the characters is inputted in the address part on the screen by pressing the enter button 32. is inputted, the information relating to the WWW address is obtained by selecting "OK" with the cursor 33 and by pressing the enter button 32.

Figure 6B:
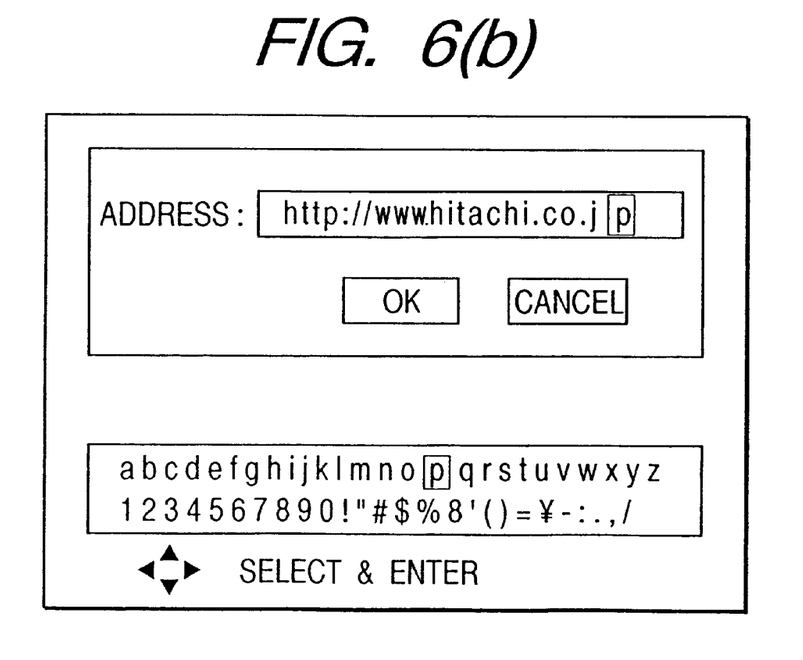

An example of the operation of each part relating to the operation of the mouse and the software keyboard will be explained. By pressing one of the direction indication buttons 31a–31d, the command that represents whether the key is pressed is outputted to the first PC interface control circuit 21a from the control processing means 16. The cursor indication 33 is shifted by the information from the PC 23 as if an actual mouse were operated, when the first PC interface control circuit 21a outputs a command that represents a required amount of movement of the mouse, a direction of movement of the mouse, etc., to the PC controlling part 25. In the case of the software keyboard, when a character "p" is selected from the selection screen and the enter button 32 is pressed, a key code is outputted to the second PC interface control circuit 21b from the control processing means 16. The second interface control circuit 21b will output a key code to the PC controlling part 25 as if the character "p" were inputted from an actual keyboard and the PC 23 displays "p" in the address part on the screen as shown in FIG. 6(b).

As explained above, according to the present invention, the PC 23 is operated by the remote controller of the TV and the TV is placed in the PC mode automatically by turning on the power of the PC 23. Thus, it is very convenient for a user to operate the PC 23 by using the remote controller for the TV.

In addition, it is possible to input a character by using the remote controller for the TV similar to the operation of a keyboard without using an actual keyboard, according to the invention.

While we have shown and described several embodiments in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

What is claimed is:

1. A television receiver comprising:
   a terminal for connection to a personal computer for inputting information from said personal compute;
   a display for displaying a television signal;
   input operation means for generating a command signal; and
   a controller responsive to said command signal for controlling said personal computer and for inputting said information from said personal computer through said terminal to said television receiver for converting said television receiver from a television operating mode to a personal computer operating mode and for displaying said information on a screen of said display;
   wherein, said personal computer and said television receiver are controlled by said command signal from said input operation means; and
   wherein said controller further comprises a detector for detecting power supplied from said personal computer and for turning the operating mode of said television receiver to a personal computer input mode for receiving said information from said personal computer.

2. A television receiver according to claim 1, wherein said input operation means comprises direction indication means for operating a cursor, and wherein said controller has a function for inhibiting said direction indication means provided in said input operation means by detecting that said personal computer is not connected.

3. A television receiver comprising:

a PC input terminal which connects to a personal computer and receives a PC signal output from the personal computer;

a display unit, including a screen, which displays at least one of a television signal and the PC signal on the screen of the display unit; and a controller, responsive to an output signal of a remote controller which controls the television receiver, which generates a command signal including key information and/or cursor movement information which can be processed by the personal computer corresponding to the output signal of the remote controller and controls the personal computer based on the command signal, thereby enabling the television receiver and the personal computer to be controlled by the output signal of the remote controller;

wherein the personal computer displays a cursor on the screen of the display unit;

wherein the remote controller includes a direction indication unit which indicates a direction of movement of the cursor on the screen of the display unit and moves the cursor in the indicated direction on the screen of the display unit, and a determination button which determines an item on the screen of the display unit to be indicated by the cursor; and wherein the television receiver further comprises a screen display processor which displays a software keyboard on the screen of the display unit, the software keyboard including a plurality of characters, symbols, and/or numbers which can be selected from the software keyboard displayed on the screen of the display unit using the cursor by operating the direction indication unit and the determination button.

4. A television receiver according to claim 3, wherein the remote controller further includes a channel selector unit which selects television channels of the television receiver and also serves as the direction indication unit.

5. A television receiver according to claim 3, wherein the screen display processor stores a menu for setting an operational condition of a mouse and displays the menu on the screen of the display unit; and wherein a desired operational condition of the mouse can be selected from the menu displayed on the screen of the display unit using the cursor by operating the direction indication unit and the determination button.

6. A television receiver according to claim 3, wherein the controller outputs key codes corresponding to the characters, symbols, and/or numbers which are selected using the cursor as the command signal to the personal computer.

7. A television receiver according to claim 3, wherein the remote controller further includes a drag mode button which causes the remote controller to generate a drag mode signal;

wherein the screen display processor displays a drag mode indicator on the screen of the display unit in response to the drag mode signal; and wherein a drag operation can be performed on the screen of the display unit using the cursor by operating the direction indication unit and the determination button while the drag mode indicator is displayed on the screen of the display unit.

8. A television receiver according to claim 3, wherein the direction indication unit is constituted by a plurality of buttons arranged in a shape of a cross.

9. A television receiver according to claim 3, further comprising a PC interface control circuit, connected between the PC input terminal and the controller, which receives the command signal from the controller and outputs the command signal to the personal computer via the PC input terminal.

10. A television receiver comprising:

a PC input terminal which connects to a personal computer and receives a PC signal output from the personal computer;

a display unit, including a screen, which displays at least one of a television signal and the PC signal on the screen of the display unit;

a controller, responsive to an output signal of a remote controller which controls the television receiver, which outputs a command signal corresponding to the output signal of the remote controller to the personal computer via the PC input terminal and controls the personal computer based on the command signal, thereby enabling the television receiver and the personal computer to be controlled by the output signal of the remote controller; and a PC interface control circuit, connected between the PC input terminal and the controller, which receives the command signal from the controller and outputs the command signal to the personal computer via the PC input terminal;

wherein the personal computer supplies power to the PC interface control circuit via the PC input terminal when the personal computer is connected to the PC input terminal and is turned on;

wherein the PC interface control circuit detects whether the personal computer is supplying power to the PC interface control circuit, and notifies the controller whether the personal computer is supplying power to the PC interface control circuit;

wherein if the PC interface control circuit notifies the controller that the personal computer is supplying power to the PC interface control circuit, the controller switches to a PC control mode which enables the personal computer to be controlled by the output signal of the remote controller; and wherein if the PC interface control circuit does not notify the controller that the personal computer is supplying power to the PC interface control circuit, the controller switches to a television receiver control mode which enables the television receiver to be controlled by the output signal of the remote controller.

11. A television receiver according to claim 10, wherein the personal computer displays a cursor on the screen of the display unit;

wherein the remote controller includes a direction indication unit which indicates a direction of movement of the cursor on the screen of the display unit and moves the cursor in the indicated direction on the screen of the display unit; and wherein if the PC interface control circuit does not notify the controller that the personal computer is supplying power to the PC interface control circuit, the controller inhibits a cursor movement operation instructed by the remote controller.

12. A television receiver comprising:
a PC input terminal which connects to a personal computer and receives a PC signal output from the personal computer;
a display unit, including a screen, which displays at least one of a television signal and the PC signal on the screen of the display unit;
a controller, responsive to an output signal of a remote controller which controls the television receiver, which outputs a command signal corresponding to the output signal of the remote controller to the personal computer via the PC input terminal and controls the personal computer based on the command signal, thereby enabling the television receiver and the personal computer to be controlled by the output signal of the remote controller; and
a PC interface control circuit, connected between the PC input terminal and the controller, which receives the command signal from the controller and outputs the command signal to the personal computer via the PC input terminal;
wherein the personal computer outputs a command to the PC interface control circuit via the PC input terminal when the personal computer is connected to the PC input terminal and is turned on;
wherein if the PC interface control circuit receives the command from the personal computer, the PC interface control circuit outputs the command to the controller;
wherein if the controller receives the command from the PC interface control circuit, the controller switches to a PC control mode which enables the personal computer to be controlled by the output signal from the remote controller; and
wherein if the controller does not receive the command from the PC interface control circuit, the controller switches to a television receiver control mode which enables the television receiver to be controlled by the output signal from the remote controller.

13. A television receiver according to claim 12, wherein the personal computer displays a cursor on the screen of the display unit;
wherein the remote controller includes a direction indication unit which indicates a direction of movement of the cursor on the screen of the display unit and moves the cursor in the indicated direction on the screen of the display unit; and
wherein if the controller does nor receive the command from the PC interface control circuit, the controller inhibits a cursor movement operation instructed by the remote controller.

14. A television receiver comprising:
a PC input terminal which connects to a personal computer and receives a PC signal output from the personal computer;
a display unit, including a screen, which displays at least one of a television signal and the PC signal on the screen of the display unit;
a controller, responsive to an output signal of a remote controller which controls the television receiver, which generates a command signal including key information and/or cursor movement information which can be processed by the personal computer corresponding to the output signal of the remote controller and outputs the command signal; and a PC interface control circuit, connected between the PC input terminal and the controller, which communicates with the controller and the personal computer, and which receives the command signal from the controller and outputs the command signal to the personal computer via the PC input terminal;
wherein the remote controller includes
a direction indication unit which indicates a direction of movement of a cursor on the screen of the display unit and moves the cursor in the indicated direction on the screen of the display unit, and
a determination button which determines an item on the screen of the display unit to be indicated by the cursor; and
wherein the television receiver further comprises a screen display processor which displays a software keyboard on the screen of the display unit, the software keyboard including a plurality of characters, symbols, and/or numbers which can be selected from the software keyboard displayed on the screen of the display unit using the cursor by operating the direction indication unit and the determination button.

15. A television receive according to claim 14, wherein the controller generates key codes corresponding to the characters, symbols, and/or numbers which are selected the key codes as the command signal.

16. A television receiver according to claim 14, wherein the controller generates and outputs a plurality of different command signals including
a mouse command signal representing operation of a mouse, and
a keyboard command signal representing operation of a keyboard;
wherein the PC interface control circuit includes:
first PC interface controller, connected between the PC input terminal and the controller, which communicates with the controller and the personal computer, and which receives the mouse command signal from the controller and outputs the mouse command signal to the personal computer via the PC input terminal; and
a second PC interface controller, connected between the PC input terminal and the controller, which communicates with the controller and the personal computer, and which receives the keyboard command signal from the controller and outputs the keyboard command signal to the personal computer via the PC input terminal.

17. A television receiver which connects to a personal computer, the television receiver comprising:
a display unit, including a screen, which displays a PC signal output from the personal computer on the screen of the display unit; and
a PC interface control circuit which, when the personal computer is connected to television receiver, outputs to the personal computer a command signal for controlling the personal computer, the command signal including key information and/or cursor movement information which can be processed by the personal computer and being generated based on an output signal of a remote controller which controls the television receivers;
wherein the remote controller includes
a direction indication unit which indicates a direction of movement of a cursor on the screen of the display unit and moves the cursor in the indicated direction on the screen of the display unit, and a determination button which determines an item on the screen of the display unit to be indicated by the cursor; and wherein the television receiver further comprises a screen display processor which displays a software keyboard on the screen of the display unit, the software keyboard including a plurality of characters, symbols, and/or numbers which can be selected from the software keyboard displayed on the screen of the display unit using the cursor by operating the direction indication unit and the determination button.

18. A television receiver which connects to a personal computer, the television receiver comprising:

a display unit, including a screen, which displays a PC signal output from the personal computer on the screen of the display unit;

a controller which, when the personal computer is connected to the television receiver, generates a command signal for controlling the personal computer based on an output signal of a remote controller which controls the television receiver, the command signal including key information and/or cursor movement information which can be processed by the personal computer; and a PC interface control circuit, connected to the controller, which receives the command signal from the controller and outputs the command signal to the personal computer, thereby enabling the personal computer to be controlled by the remote controller;

wherein the remote controller includes a direction indication unit which indicates a direction of movement of a cursor on the screen of the display unit and moves the cursor in the indicated direction on the screen of the display unit, and a determination button which determines an item on the screen of the display unit to be indicated by the cursor; and wherein the television receiver further comprises a screen display processor which displays a software keyboard on the screen of the display unit, the software keyboard including a plurality of characters, symbols, and/or numbers which can be selected from the software keyboard displayed on the screen of the display unit using the cursor by operating the direction indication unit and the determination button.

19. A television receiver comprising:

a PC input terminal which connects to a personal computer and receives a video signal output from the personal computer;

a display unit, including a screen, which displays a television signal or the video signal on the screen of the display unit;

a display processor which, when the video signal is displayed on the screen of the display unit, displays a software on the screen of the display unit, the software keyboard including a plurality of characters, symbols, and/or number which can be selected from the software keyboard displayed on the screen of the display unit using a remote controller which controls the television receiver; and a PC interface control circuit which outputs to the personal computer key codes corresponding to the characters, symbols, and/or numbers which are selected from the software keyboard using the remote controller, thereby enabling characters, symbols, and/or symbols to be input to the personal computer using the remote controller.

20. A television receiver according to claim 19, further comprising a controller, connected to the PC interface control circuit, which generates the key codes corresponding to the characters, symbols, and/or numbers which are selected from the software keyboard using the remote controller, and outputs the key codes to the PC interface control circuit.

21. A television receiver comprising:

a terminal for connection to a personal computer for inputting information from said personal computer;

a display for displaying a television signal;

input operation means for generating a command signal; and a controller responsive to said command signal for controlling said personal computer and for inputting said information from said personal computer through said terminal to said television receiver for converting said television receiver from a television operating mode to a personal computer operating mode and for displaying said information on a screen of said display;

wherein, said personal computer and said television receiver are controlled by said command signal from said input operation means;

wherein said controller further comprises a detector for detecting a command from said personal computer and for turning said controller to a personal computer input mode for receiving said information from said personal computer; and wherein said input operation means comprises direction indication means for operating a cursor, and wherein said controller has a function for inhibiting said direction indication means provided in said input operation means by detecting that said personal computer is not connected.

* * * * *